US005455995A

United States Patent [19]

Pool

[11] Patent Number: 5,455,995

[45] Date of Patent: Oct. 10, 1995

[54] TOOL FOR UNCOUPLING QUICK CONNECT TUBULAR COUPLINGS

[75] Inventor: James L. Pool, Clarinda, Iowa

[73] Assignee: Lisle Corporation, Clarinda, Iowa

[21] Appl. No.: 112,682

[22] Filed: Aug. 26, 1993

[51] Int. Cl.[6] .......... F16L 35/00

[52] U.S. Cl. .......... 29/237

[58] Field of Search .......... 285/39, 315; 29/237, 29/235, 272, 268, 270; 294/99.1, 99.2, 33; 7/125, 126; 81/3.8, 13, 53.11, 424.5, 427

[56] References Cited

U.S. PATENT DOCUMENTS

| | | | |
|---|---|---|---|
| 4,055,359 | 10/1977 | McWethy | 285/39 |
| 4,927,185 | 5/1990 | McNaughton | 285/39 |
| 5,084,954 | 2/1992 | Klinger | 29/237 |
| 5,187,851 | 2/1993 | Klinger | 29/237 |

OTHER PUBLICATIONS

Shark Brochure "New . . . Shark Quick Disconnect Tool for Air Conditioning and Fuel Lines", 210 (undated).

Owatona Tool Company Catalogue, Special Automotive Tools—Engine Service "A/C Spring Lock Coupling Tools", Product Nos. 7238, 7239, 7240, 7241 and 7242, p. 54 (undated).

Owatona Tool Company Catalogue, "Fuel Line Disconnect Tool Kit", Product No. 7363, p. 3 (undated).

*Primary Examiner*—Robert C. Watson

*Attorney, Agent, or Firm*—Banner & Allegretti, Ltd.

[57] ABSTRACT

A unitary molded tool for decoupling telescoping tubular members includes two companion spring engaging sectors joined along one longitudinal edge by a collar which has a greater radius than the sectors and which is attached to the separate sectors by spaced rib members.

9 Claims, 2 Drawing Sheets

TOOL FOR UNCOUPLING QUICK CONNECT TUBULAR COUPLINGS

BACKGROUND OF THE INVENTION

This invention relates to a tool useful for disengaging quick connect tubular couplings of the type recently introduced in the automotive industry.

The American automotive industry has just recently introduced quick connect tubular couplings typically used to connect tubes leading to and from various automotive components such as radiators, pumps and the like. Such quick connect couplings are also useful in other environments including appliances, air conditioners, machine tools, and the like. A quick connect tubular coupling construction is disclosed in U.S. Pat. No. 4,055,359 which is incorporated herewith by reference. The referenced patent discloses a larger diameter tube adapted to slidably or telescopically receive a smaller diameter tube with O-ring seals between the tubes. The distal end of the larger diameter tube has an upwardly and outwardly flaring flange which is received in a slot defined in an annular cage mounted on the outside circumferential surface of the smaller diameter tube. A circular, compression spring is retained in the cage and fits over and engages the flange of the larger diameter tube to retain the tubes in a locked condition.

U.S. Pat. No. 4,055,359 also discloses a tool which is useful for disconnecting the quick connect tubular couplings. That tool includes a cylindrical body with an annular portion that fits through the slot in the cage mounted on the smaller diameter tube so as to engage the circular spring and thereby remove the spring from locking engagement with the flange on the larger diameter tube. Other tool manufacturers have developed similar tools for disconnecting such couplings. For example, Owatona Tool Company, sells a disconnect tool kit, Product No. 7363, which appears to be substantially similar to the tool disclosed in the '359 patent. Owatona also sells alternative disconnect tools, Product No. 7335, No. 7336 and No. 7361. Owatona Product Nos. 7335 and 7336 consist of a spring decoupling tool having two plastic shells held together by a pivot pin and a biasing spring. Product No. 7361 comprises a unitary molded cylinder which has a living spring on one side that allows the two half sections of the tool to slip over the lines being disconnected. Yet a third style, Owatona Product No. 7244 is totally machined from metal.

All of these tools accomplish their intended purpose. They are, however, somewhat expensive to manufacture. The materials utilized are expensive. The tool which incorporates the molded living spring tends to fail after a limited amount of use. Thus there has resulted a need for an improved tool especially useful for decoupling of quick connect tubular couplings in the automotive arts and other arts utilizing such tube connectors.

SUMMARY OF THE INVENTION

Briefly, the present invention comprises an improved tool for decoupling or disconnecting a first larger diameter tube from a second smaller diameter tube wherein the tubes are inserted or telescoped one into the other and retained together by a circular spring held in a cage mounted on the smaller diameter tube against an outwardly flaring flange on the end of the larger diameter tube. The disconnect tool includes first and second spring engaging sectors or sections of a cylinder with an internal diameter substantially the same as that of the larger diameter tube to be disconnected. Thus, the cylinder sectors have an end which is designed to engage against the circular spring by slidably fitting through the slot between the spring retaining cage and the larger diameter tube. The sectors are joined together by an oversized, annular, elastic, split, cylindrical member which is connected to the sectors by means of ribs specially positioned for connecting the sectors to the cylindrical member. The cylindrical member has a slot or split therethrough so that it may be spread over the larger tube thereby permitting the cylindrical sectors to be fitted over the larger diameter tube for slidable engagement with the circular spring.

Thus, it is an object of the invention to provide an improved tool for disconnecting a larger diameter tube from a second smaller diameter tube held together by a quick connect mechanism.

It is a further object of the invention to provide an improved tool for use with quick connect tubular couplings wherein the tool may be molded from a single material in a single operation.

Yet a further object of the invention is to provide an inexpensive tool which may be used in combination with quick connect tubular couplings for decoupling such tubes.

Another object of the invention is to provide a quick connect tubular decoupling tool which is rugged, has a long life, is lightweight and is inexpensive.

These and other objects, advantages and features of the invention will be set forth in the detailed description which follows.

BRIEF DESCRIPTION OF THE DRAWING

In the detailed description which follows reference will be made to the drawing comprised of the following figures.

DETAILED DESCRIPTION OF THE PREFERRED EMBODIMENT

Figure 1:
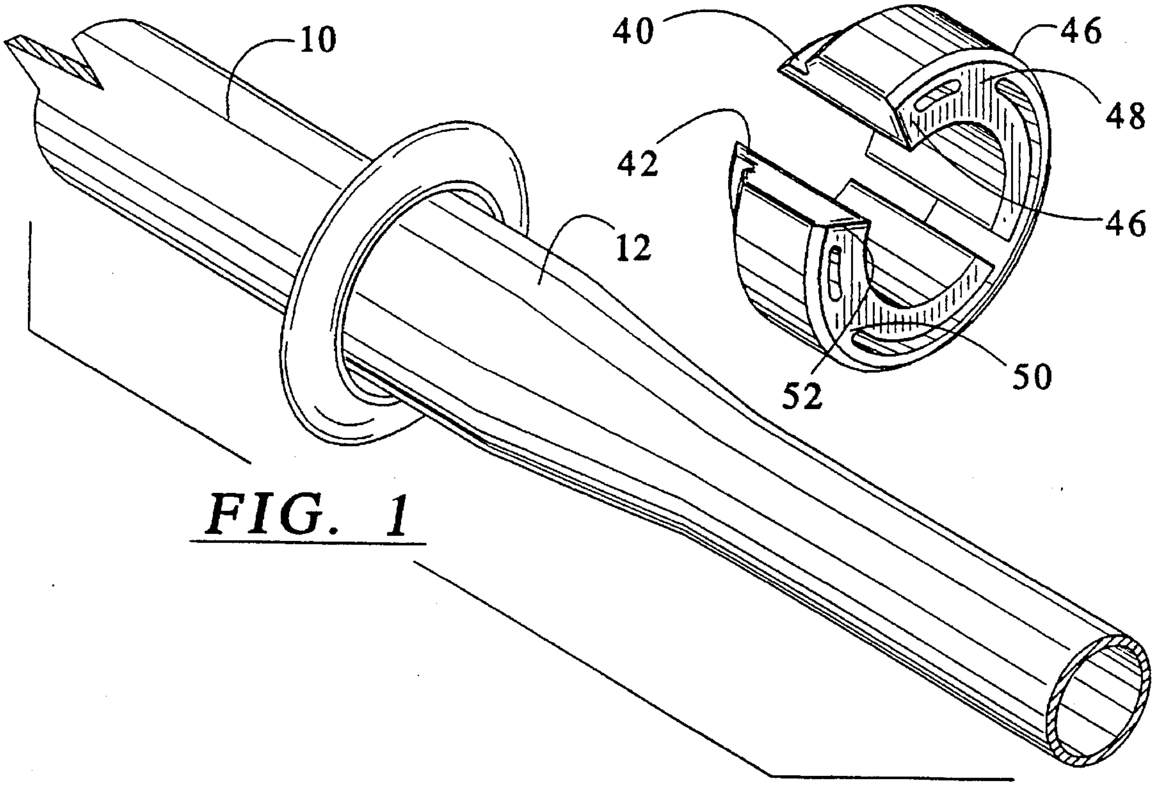
FIG. 1 is a isometric view illustrating a typical quick connect tubular coupling arrangement and further illustrating an embodiment of the improved tool of the invention.

Referring first to FIG. 1, there is illustrated a typical quick connect tubular coupling arrangement of the type depicted in U.S. Pat. No. 4,055,359. A smaller diameter tube 10 telescopically fits as slides into a larger diameter tube 12. The outside diameter of the smaller diameter tube 10 is slightly less than the inside diameter of the larger diameter tube 12. An annular cage 14 is afixed to the outside surface 16 of the smaller diameter tube 10 at a fixed distance from the end 18 of the smaller diameter tube 10. The cage 14 includes an annular, circumferential slot 20 into which the tube 12 may be inserted. The tube 12 includes an end flange 22 which is outwardly and upwardly flared and which also fits through the slot 20.

A circular, compression spring 24 is retained within the cage 14. The spring 24 compresses against the tube 12 and normally rests against the forward surface 26 of the flange 22 and also against the inside front edge of the cage 14 adjacent slot 20 to thereby retain the tube 12 in position locked by the interaction of spring 24 with the cage 14. In this manner, the tube 12 cannot be withdrawn from telescopying engagement with the tube 10 inasmuch as the spring 24 in effect is locked against the forward edge of the cage 14 and therefore the flange 22 cannot be withdrawn through the slot 20.

Typically grooves are provided in the tube 10, such as grooves 28, about the circumference of the smaller diameter tube 10, into which O-rings 30 are inserted so that when the tube 10 is telescopically inserted into the tube 12 there is sealing engagement between the tubes 10, 12.

In order to decouple or disconnect the tube 10 from the tube 12 it is known, by reference to U.S. Pat. No. 4,055,359, that it is necessary to engage the circular, compression spring 24 and push that spring 24 upwardly onto the top of the flange 22. This will permit the larger diameter tube 12 and flange 22 to then be withdrawn through the slot 20 of the cage 14. It is also known that various tools may be utilized for insertion into the slot 20 to engage and move the circular spring 24 thereby permitting removal of the tube 12 from engagement with the spring 24 and cage 14.

The present invention relates to an improved tool for effecting the decoupling or disconnecting operation described. Specifically, the tool of the present invention is a single molded tool which is preferably molded from an elastic material such as Delrin® acetal resin, a trademarked product of E.I. du Pont de Nemours & Co. (Inc.). The tool of the present invention is sized so that each tool is specifically sized and has the capability of being utilized with a specifically sized tube and, in particular each specific size of, larger diameter tube 12. Thus, each disconnect tool of the present invention is custom designed for use with respect to tubes of specific diameter, and a set of such tools would typically be provided for use by a mechanic. The set would include tools useful with a series of standard diameter tubes.

The tool of the present invention is comprised of first and second molded cylindrical sections or sectors 40 and 42. These sectors 40, 42 are curved to fit against the outside surface of the larger diameter tube 12 and are retained in such a position by an annular, cylindrical, split, elastic collar 44 which is joined to each of the separate sectors 40, 42 by ribs 46, 48, 50 and 52. The size, construction and configuration of these elements are important features of the invention.

Figure 4:
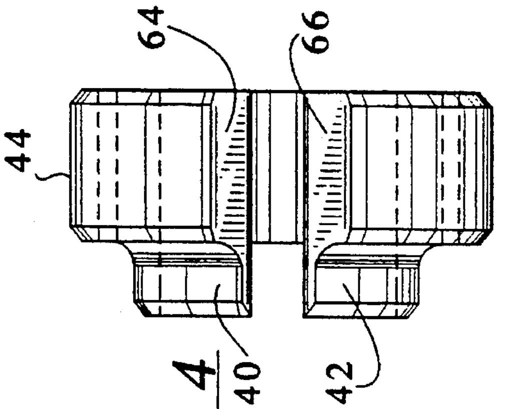
FIG. 4 is a side elevation of the tool of FIG. 3.
Figure 2:
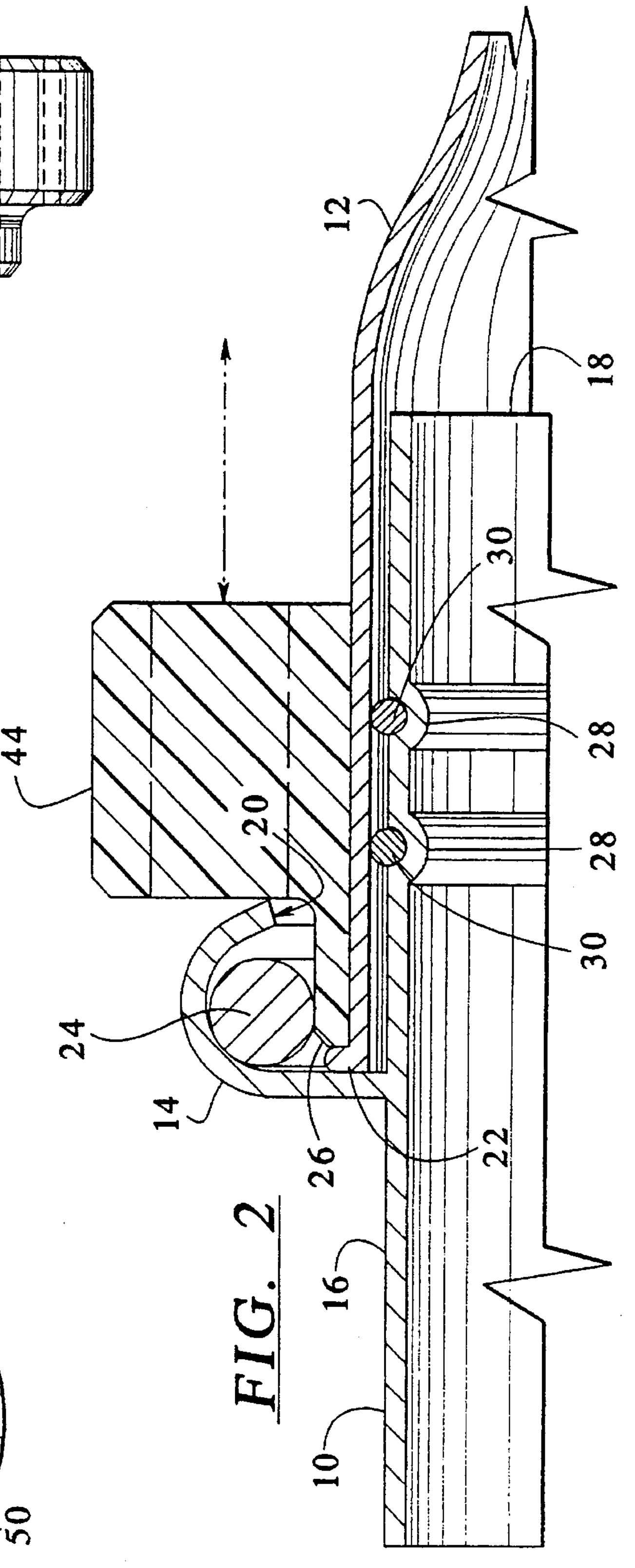
FIG. 2 is a cross-sectional view of the quick connect tubular coupling of the present invention wherein the tool of the invention has been positioned to disengage the tubes which are coupled.
Figure 3:
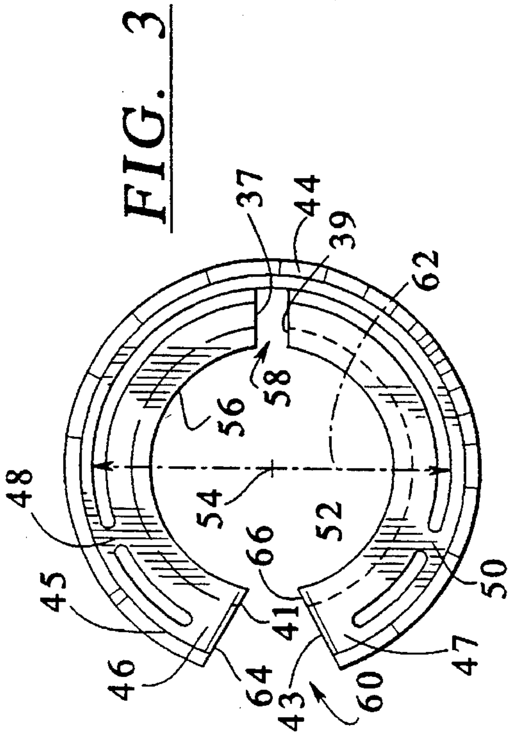
FIG. 3 is a plan view of an embodiment of the improved tool of the invention.

Referring to FIGS. 3 and 4, the sectors 40 and 42 are substantially identical to each other. The sectors 40 and 42 are sectors or parts of a cylinder having a centerline axis 54 which is coincident with the centerline axis of the collar 44. Each sector 40 and 42 thus has an internal surface 56 with a radius which is substantially the same or slightly greater than the radius of the larger diameter tube 12 over which the particular tool is designed to fit. Each of the sectors 40 and 42 also extends circumferentially partially about the tube 12 generally in the range of 90° to 160°, although this extent may be varied. Each sector 40, 42 also includes longitudinal edges 41, 43 parallel to axis 54. In the embodiment shown it is noted that it is important that the sectors 40 and 42 are spaced or separated in their normal configuration so that their opposite longitudinal edges 37, 39 are separated and define a gap or slot 58 along one side of the tool. A larger gap or slot 60 is defined on the opposite side of the tool. The thickness of sectors 40, 42 permits longitudinal access or sliding into slot 20.

The collar 44 also has an annular cylindrical shape with an internal diameter 62 which is sufficiently large so that the collar 44 is spaced from the sectors 40 and 42. Collar 44 has spaced lateral edges 45, 47 attached to sectors 40, 42 by means of ribs 46 and 52. Additional connecting ribs 48 and 50 adjacent, but spaced from ribs 46, 52 are also provided for structural integrity. It is preferred that the attachment of the collar 44 to the sectors 40 and 42 take place toward the edges 45, 47 of the collar 44 in order to extend the length of an elastic or living hinge which is, in effect, defined by the collar 44. That is, the circumferential extent of the collar 44 between the ribs 48 and 50 defines effectively an elastic hinge connecting the sectors 40 and 42. One of the objects of the design is to maximize the length of this hinge so as to increase useful tool life. Thus, the ribs 48 and 50 are preferably spaced from one another by at least 180° and preferably a slightly greater amount as depicted in FIG. 3. It is possible, of course, to place reinforcing ribs more closely between the collar 44 and the sectors 40 and 42 and still be within the scope and spirit of the invention. However, it is most appropriate to have the spacing of ribs be in the vicinity of at least 90° in order to extend the length of the hinge defined by the collar 44.

The collar 44, of course, does not form a total cylinder. There is a gap between the edges or ends 45, 47 of the collar 44 which, in the embodiment depicted in FIG. 3, is a gap that is wider than the slot 58. Preferably, the gap 60 is defined by surfaces 64 and 66 which intersect at an acute angle with the vertex of the angle positioned inside the outside diameter of the collar 44. In this manner the surfaces 64 and 66 define wedge shaped or inclined surfaces which facilitate the placement of the tool over the large diameter tube 12 and consequent flexing of the hinge portion of the collar. The collar 44 has a circumferential extent in the range of about 300°, plus or minus 30° to 40°. In this manner a tool is provided wherein a maximum amount of engagement of sectors 40 and 42 against a circular spring 24 is insured.

In the embodiment depicted, there are two ribs 46 and 50 associated with the connection between each sector 40, 42 and the collar 44. Varying numbers of ribs may be utilized, though two ribs are preferred. It is noted that the tool of the invention may be molded from a single material in a single operation, thus making the manufacture of the tool inexpensive and efficient.

Figure 5:
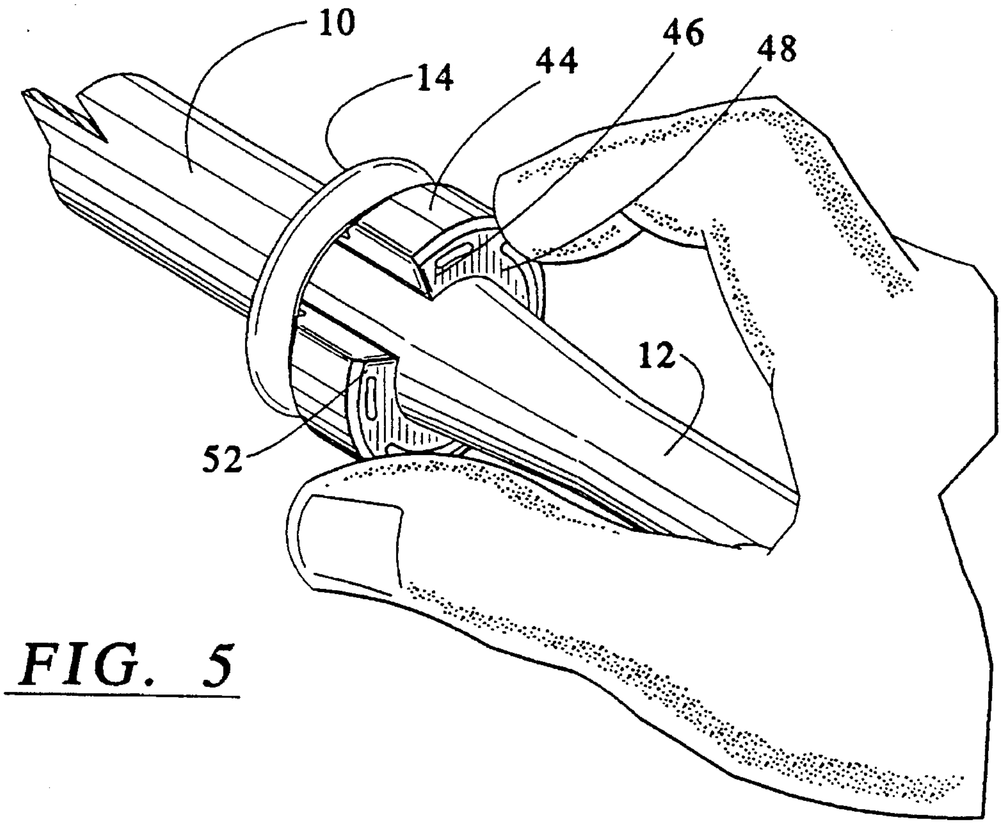
FIG. 5 is an isometric view illustrating the manual operation of the tool of the present invention.

FIG. 5 illustrates the manual operation of the tool or, in other words, the manner in which the tool is placed on a tube and then manually pushed against the circular spring 24. There are variants of the invention which are considered to be within the scope of the following claims. For example, the number of ribs may be varied. The circumferential length of the sectors 40, 42 as well as the collar 44 may be varied. The number of sectors may be varied, though again the preference is the design which is depicted in the drawings. Thus, while there has been set forth that a preferred embodiment of the invention, it is understood that the invention is to be limited only by the following claims and their equivalents.

What is claimed is:

1. A tool for disconnecting a first larger diameter tube and a second, smaller diameter tube, the second, smaller diameter tube being inserted into the first larger diameter tube and retained therein by a circular, compression spring engaged against an outwardly flaring flange on the end of the larger diameter tube, said circular spring being retained by an annular cage mounted on the smaller diameter tube, said cage including an annular circumferential slot between the smaller diameter tube and cage for receipt of the flared end of the large diameter tube and for precluding withdrawal of the larger diameter tube by interaction of the cage, spring and flange, said tool comprising, in combination:

first and second sectors of a spring engaging cylinder, said sectors having an outside diameter, an internal diameter substantially the same as the diameter of the large diameter tube so that the sectors may be slidably fitted against the outer surface of the larger diameter tube, said sectors defining a centerline axis and a spring engaging end, said sectors being spaced from each other on the circumference of the larger diameter tube to thereby define diametral gaps between the sectors when mounted on the first, larger diameter tube;

a single, annular cylindrical, split, elastic collar surrounding the sectors and having an internal diameter greater than the outside diameter of the sectors so as to be spaced radially outward from the sectors, said collar also having a centerline axis generally coincident with the centerline axis of the sectors, said collar surrounding and fitting over one end of the sectors whereby the opposite end of the sectors may be inserted into the circumferential slot in the cage without interference by the collar; and connection ribs extending from the inside of the collar radially inwardly and connecting the single collar to each of the sectors, whereby flexing of the collar may be effected to simultaneously move the sectors and vary the diametral spacing thereof to thereby position the sectors against the outer surface of the larger tube so that the spring engaging end of the sectors may be axially translated against the circular spring to effect decoupling of the tubes.

2. The tool of claim 1 comprising two sectors of equal size.

3. The tool of claim 1 comprising two sectors which each extend partially circumferentially around the larger tube and which each include first and second spaced side edges, and wherein the first side edges of each sector are joined to the elastic collar by at least one radial rib.

4. The tool of claim 1 comprised of an integrally and unitary molded elastic material.

5. The tool of claim 1 comprising two sectors, each sector has a circumferential extent in the range of about 90° to 160°.

6. The tool of claim 1 wherein the collar has a circumferential extent of about 300°.

7. The tool of claim 1 wherein the radial ribs connecting separate sectors to the collar are spaced at least 180° from each other to define a partial cylindrical, elastic hinge between the ribs.

8. The tool of claim 1 wherein the edges of the collar defining the split in the collar are tapered to define a radially outwardly expanding wedge configuration in cross section.

9. A tool for decoupling connectors comprising, in combination:

an elastic, cylindrically shaped, split collar having an internal diameter surface, first and second spaced, split ends spaced from each other;

integral, inwardly projecting, generally radial, connecting ribs extending from the internal diameter surface; and at least two separate sectors of a cylinder positioned within the collar and integrally connected by the inwardly extending ribs to the collar, said sectors being generally coaxial with the collar, and surrounded by the collar, said sectors extending axially beyond the axial extent of the collar to define active decoupling ends, said sectors movable in response to flexing of the collar whereby the collar may be flexed to simultaneously adjust the sectors to fit about a tubular connector for engaging and decoupling the connector with the decoupling ends.

* * * * *